US012767222B2

(12) United States Patent
Seong et al.

(10) Patent No.: US 12,767,222 B2
(45) Date of Patent: Oct. 20, 2026

(54) INDEPENDENT STEERING APPARATUS

(71) Applicants: HYUNDAI MOTOR COMPANY, Seoul (KR); KIA CORPORATION, Seoul (KR)

(72) Inventors: Jun Ho Seong, Seoul (KR); Min Jun Kim, Busan (KR); Woo Keun Park, Seongnam-si (KR); Sehyun Chang, Suwon-si (KR); Youngil Sohn, Yongin-si (KR)

(73) Assignees: HYUNDAI MOTOR COMPANY, Seoul (KR); KIA CORPORATON, Seoul (KR)

( * ) Notice: Subject to any disclaimer, the term of this patent is extended or adjusted under 35 U.S.C. 154(b) by 363 days.

(21) Appl. No.: 18/534,385

(22) Filed: Dec. 8, 2023

(65) Prior Publication Data

US 2025/0083742 A1 Mar. 13, 2025

(30) Foreign Application Priority Data

Sep. 7, 2023 (KR) ........................ 10-2023-0118702

(51) Int. Cl.
*B62D 7/18* (2006.01)
*B62D 5/04* (2006.01)

(52) U.S. Cl.
CPC ............. *B62D 7/18* (2013.01); *B62D 5/0418* (2013.01)

(58) Field of Classification Search
CPC ................................ B62D 7/18; B62D 5/0418
See application file for complete search history.

(56) References Cited

U.S. PATENT DOCUMENTS

| | | | | | |
|---|---|---|---|---|---|
| 4,877,098 | A * | 10/1989 | Asanuma | B60G 13/001 180/444 |
| 11,180,207 | B2 | 11/2021 | Sardes et al. | |
| 2020/0070883 | A1 * | 3/2020 | Du | B60G 3/20 |
| 2020/0207405 | A1 * | 7/2020 | Kuribayashi | B60G 3/18 |
| 2021/0086822 | A1 * | 3/2021 | Furuyoshi | B62D 5/0484 |
| 2024/0124048 | A1 * | 4/2024 | Oh | B62D 7/18 |

FOREIGN PATENT DOCUMENTS

| | | | |
|---|---|---|---|
| JP | 2023005441 | A | 1/2023 |
| KR | 20070103191 | A | 10/2007 |
| KR | 20220020666 | A | 2/2022 |
| KR | 20220094753 | A | 7/2022 |
| KR | 102430371 | B1 | 8/2022 |
| KR | 102512092 | B1 | 3/2023 |

* cited by examiner

*Primary Examiner* — Christopher B Wehrly
(74) *Attorney, Agent, or Firm* — Lempia Summerfield Katz LLC

(57) ABSTRACT

An independent steering apparatus includes a wheel of a vehicle, a knuckle integrally fixed to the wheel, a steering driving part configured to generate steering driving force, a deceleration part connected to an output shaft of the steering driving part and configured to transmit the steering driving force, and a deceleration part housing having the deceleration part located therein. In particular, the steering driving part is integrally fixed to the deceleration part housing, and the deceleration part housing is integrally fixed to the knuckle. The steering driving force generated by the steering driving part is transmitted to the deceleration part housing through the deceleration part, thereby rotating the knuckle.

13 Claims, 6 Drawing Sheets

INDEPENDENT STEERING APPARATUS

CROSS-REFERENCE TO RELATED APPLICATION

This application claims, under 35 U.S.C. § 119(a), the benefit of priority to Korean Patent Application No. 10-2023-0118702, filed on Sep. 7, 2023, the entire contents of which are incorporated herein by reference.

BACKGROUND

(a) Technical Field

The present disclosure relates to an independent steering apparatus. More particularly, it relates to an independent steering apparatus capable of providing a compact steering apparatus configured to allow a steering driving part to be integrally rotated with a knuckle and to respond to a steering angle input.

(b) Background Art

A steering apparatus of a conventional vehicle is capable of controlling the direction in which the vehicle moves (e.g., turning left or right), by inputting a steering angle to front wheels using a planetary gear, a clutch, and a hydraulic pump in response to a steering angle input of a steering wheel.

In other words, the steering apparatus is configured to input the steering angle to the wheels in response to the steering angle input of the steering wheel, and the same applies rotational force to the front wheels of the vehicle using a hydraulic mechanical apparatus coupled to the vehicle body or electrically controlled motor driving.

Recently, development has been conducted on an independent steering apparatus coupled to each wheel and configured to input a steering angle to a wheel through a motor assembly. In other words, because the independent steering apparatus is coupled to each wheel, steering angle inputs applied to respective wheels may be different from each other.

However, the independent steering apparatus requires a complicate coupling relationship between various components adopted to transmit driving force in order to apply rotational force to a knuckle through a steering driving part located in the vehicle body. Additionally, Because the steering apparatus has such a coupling structure between the components adopted to transmit driving force, the structure thereof in a wheelhouse becomes large.

The above information disclosed in this Background section is provided only to enhance understanding of the background of the present disclosure, and therefore it may contain information that does not form the prior art that is already known to a person of ordinary skill in the art.

SUMMARY

The present disclosure has been made in an effort to solve the above-described problems associated with the prior art, and it is an object of the present disclosure to provide an independent steering apparatus including a steering driving part located at a position facing a deceleration part housing and fixed to the deceleration part housing.

Further, the present disclosure provides an independent steering apparatus including a steering support link formed to be integrated with a carrier of a deceleration part, a deceleration part housing integrally rotated with a ring gear of the deceleration part, and a knuckle.

The objects of the present disclosure are not limited to the above-mentioned objects, and other technical objects not mentioned herein should be clearly understood by the following description and should be more clearly understood by embodiments of the present disclosure. Additionally, the objects of the present disclosure may be realized by means indicated in the scope of the claims and combinations thereof.

In one aspect of the present disclosure, an independent steering apparatus includes a wheel of a vehicle, a knuckle integrally fixed to the wheel, a steering driving part configured to generate a steering driving force, a deceleration part connected to an output shaft of the steering driving part and configured to transmit the steering driving force, and a deceleration part housing having the deceleration part located therein. In particular, the steering driving part is integrally fixed to the deceleration part housing, and the deceleration part housing is integrally fixed to the knuckle. The steering driving force generated by the steering driving part is transmitted to the deceleration part housing through the deceleration part, thereby rotating the knuckle.

In an embodiment, the deceleration part may include a planetary gear set.

In another embodiment, the planetary gear set may have a rotational center axis coinciding with a kingpin axis.

In still another embodiment, the deceleration part may further include a plurality of external gear sets or belts.

In yet another embodiment, the planetary gear set may include three rotating elements, i.e., first, second and third rotating elements. The first rotating element may be connected to a vehicle body so as to be rotationally constrained.

In still yet another embodiment, the second rotating element may be connected to the output shaft of the steering driving part, and the third rotating element may be connected to the deceleration part housing.

In a further embodiment, the second rotating element may be a sun gear connected to the output shaft of the steering driving part, the first rotating element may be a carrier connected to the vehicle body so as to be rotationally constrained, and the third rotating element may be a ring gear connected to the deceleration part housing.

In another further embodiment, when the driving force of the steering driving part is applied to the sun gear, the carrier may be rotationally constrained by the vehicle body, and the deceleration part housing may be integrally rotated with the ring gear.

In still another further embodiment, the independent steering apparatus may further include a steering support link connected to the vehicle body and coupled to the carrier.

In yet another further embodiment, the carrier and the steering support link may be coupled to each other by a spline connection.

In still yet another further embodiment, the steering support link may be connected to the vehicle body so as to be rotationally constrained with respect to the kingpin axis.

In a still further embodiment, the independent steering apparatus may further include at least one bearing part formed between the carrier and the deceleration part housing so that the carrier and the deceleration part housing are rotatable relative to each other.

In a yet still further embodiment, the independent steering apparatus may further include slot parts respectively located at opposite ends of the knuckle facing the deceleration part housing, and coupling parts located in the deceleration part housing, wherein each of the coupling parts may be coupled to a corresponding one of the slot parts.

In another aspect, the present disclosure provides an independent steering apparatus including a wheel of a vehicle, a knuckle integrally fixed to the wheel, a steering driving part configured to generate steering driving force, a deceleration part connected to an output shaft of the steering driving part and configured to transmit the steering driving force, and a deceleration part housing having the deceleration part located therein, wherein the steering driving part is integrally fixed to the deceleration part housing, and the deceleration part housing is integrally fixed to the knuckle.

Other aspects and embodiments of the present disclosure are discussed below.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles powered by both gasoline and electricity.

The above and other features of the present disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1A:
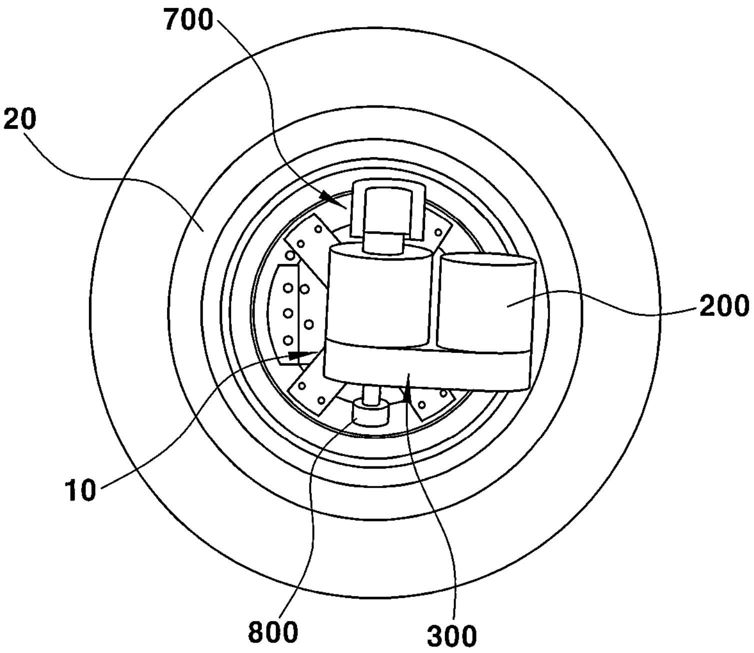
FIG. 1A is a front view of a wheel including an independent steering apparatus according to an embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes should be determined in part by the particular intended application and use environment.

In the figures, reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. While the present disclosure is described in conjunction with the embodiments, it should be understood that the present description is not intended to limit the present disclosure to the specific embodiments. On the contrary, the present disclosure is intended to cover not only the embodiments, but also various alternatives, modifications, equivalents, and other embodiments, which may be included within the spirit and scope of the present disclosure as defined by the appended claims. The present embodiments are provided to more fully explain the present disclosure to those of ordinary knowledge in the art.

Terms such as "knuckle", "link", "part", and "housing" described in the present disclosure mean a unit configured to process at least one function or operation, and the unit may be implemented by hardware or software or a combination of hardware and software.

When a component, device, element, or the like of the present disclosure is described as having a purpose or performing an operation, function, or the like, the component, device, or element should be considered herein as being "configured to" meet that purpose or to perform that operation or function.

Hereinafter, embodiments are described in detail with reference to the accompanying drawings. In describing the embodiments with reference to the accompanying drawings, the same or corresponding components are denoted by the same reference numerals and redundant description thereof has been omitted.

In one embodiment of the present disclosure, an independent steering apparatus 10 is coupled to a wheel 20 located in a vehicle and is configured to input a steering angle to each wheel 20. Here, each wheel 20 may be independently rotated so as to have a steering angle in a range of 90 to 180 degrees with respect to the longitudinal direction of the vehicle.

Further, when rotational force is applied to a kingpin axis A (illustrated in FIG. 2) by a steering driving part 200, the kingpin axis A is configured to be substantially the same as the rotation center axis around which a knuckle 100 is rotated.

Additionally, in the present disclosure, the term "face" means a coupling relationship between components located on the same side and coupled to face each other.

FIG. 1A is an inner side view of the independent steering apparatus 10 according to an embodiment of the present disclosure.

The independent steering apparatus 10 includes the knuckle 100 coupled to the wheel 20, a deceleration part housing 300 coupled to the upper end and the lower end of the knuckle 100, and the steering driving part 200 located at the upper end of one side of the deceleration part housing 300. A carrier 421 of a deceleration part 400 located in the deceleration part housing 300 is configured to protrude from the upper end of the deceleration part housing 300 and to be fixed to the vehicle body. In one embodiment, the carrier 421 is formed to protrude from the upper end of the deceleration part housing 300 and fixed to the vehicle body through a steering support link 700. In one embodiment of the present disclosure, the steering driving part 200 may be a steering motor.

The steering driving part 200 is coupled to the deceleration part housing 300. Here, the steering driving part 200 is disposed to face the deceleration part 400 that is located at and coupled to the upper end and the lower end of the knuckle 100. In other words, the steering driving part 200 is disposed in the height direction of the side of the deceleration part housing 300 that accommodates the deceleration part 400.

Additionally, the deceleration part housing 300 includes an external gear set 1000 or a belt located therein and configured to transmit driving force of the steering driving part 200 to the deceleration part 400. The external gear set 1000 or the belt is formed of at least one transmission gear engaged with a rotation center shaft of the steering driving part 200. Furthermore, the deceleration part housing 300 further includes a central shaft part located therein. Here, the central shaft part is coupled to the external gear set 1000 and is configured to transmit rotational force to the deceleration part 400. The central shaft part is configured to transmit steering driving force of the steering driving part 200 to the deceleration part 400. Furthermore, the central shaft part is located so as to transmit steering driving force from the steering driving part 200 to the deceleration part 400 through the external gear set or the belt.

In one embodiment, the deceleration part 400 may include a plurality of external gear sets or belts, and the driving force of the steering driving part 200 is transmitted to the deceleration part housing 300. Accordingly, the deceleration part 400 is connected to an output shaft 210 of the steering driving part 200 and receives steering driving force from the steering driving part 200.

In this manner, the rotation shaft of the steering driving part 200 is located in the deceleration part housing 300, and the external gear set 1000, the central shaft part, and the deceleration part 400 are located in the deceleration part housing 300, thereby allowing rotational force of the steering driving part 200 to be transmitted to the inside of the deceleration part 400.

The central shaft part is geared with the external gear set 1000 to receive rotational force from the steering driving part 200, and at least a part of the central shaft part is inserted into the deceleration part 400 located in the deceleration part housing 300 and is configured to transmit rotational force of the steering driving part 200 to the deceleration part 400.

In one embodiment, the central shaft part to which the rotational force of the steering driving part 200 is applied is inserted into a sun gear 410 of the deceleration part 400, and the rotational force is applied to planetary gear sets 420, at least one of which is located on the outer peripheral surface of the sun gear 410. Further, the deceleration part 400 further includes a ring gear 430 coupled to the outer surface of the planetary gear set 420. The ring gear 430 is formed to be integrated with the deceleration part housing 300, thereby enabling the deceleration part housing 300 to be integrally rotated with the ring gear 430 according to rotation of the ring gear 430. Additionally, the rotational center axis of the planetary gear set 420 may be configured to be the same as the kingpin axis.

In addition, the planetary gear set 420 includes three rotating elements such as the sun gear 410, the carrier 421, and the ring gear 430. Among the three rotating elements, one rotating element is connected to the output shaft of the steering driving part, another rotating element is connected to the vehicle body so as to be rotationally constrained, and the other rotating element is connected to the deceleration part housing.

According to the embodiment of the present disclosure, the planetary gear set 420 includes the sun gear 410 connected to the output shaft 210 of the steering driving part 200, a plurality of planetary gears 422 and the carrier 421 configured to contact the outer peripheral surface of the sun gear 410, and the ring gear 430 connected to the deceleration part housing 300. A part of the carrier 421 protrudes from the upper end of the deceleration part housing 300 and is connected to the vehicle body in a state of being coupled to the steering support link 700 so as to be rotationally constrained. Therefore, in response to rotation of the sun gear 410, the planetary gear 422 is only rotated around the center axis thereof, and the ring gear 430 coupled to the planetary gear 422 is configured to be integrally rotated with the deceleration part housing 300 according to rotation of the planetary gear 422.

The planetary gear set 420 includes the sun gear 410 coupled to the output shaft 210 of the steering driving part 200, the carrier 421 connected to the vehicle body so as to be rotationally constrained, and the ring gear 430 connected to the deceleration part housing 300.

Therefore, when rotational force of the steering driving part 200 is applied, the deceleration part housing 300 is configured to be integrally rotated with the ring gear 430. In other words, the deceleration part housing 300, and the steering driving part 200 and the knuckle 100, each of which is coupled to the deceleration part housing 300, are integrally rotated with respect to the kingpin axis A.

In an embodiment, the rotation shaft of the steering driving part 200 may be formed at a position parallel to the kingpin axis A, and in the embodiment of the present disclosure, the steering driving part 200 may be coupled to the deceleration part housing 300 in a state of being adjacent to the kingpin axis A formed in the knuckle 100.

Figure 1B:
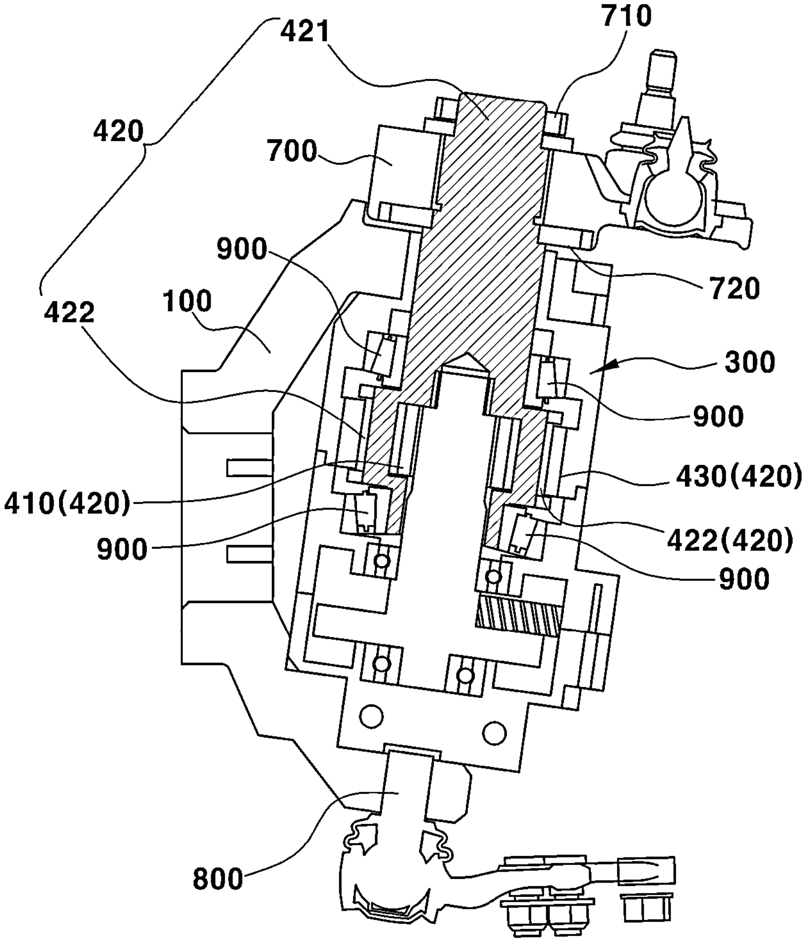
FIG. 1B is a side cross-sectional view of the independent steering apparatus according to an embodiment of the present disclosure.

FIG. 1B is a side cross-sectional view of the independent steering apparatus 10 according to an embodiment of the present disclosure.

When rotational force is applied from the steering driving part 200 to the central shaft part, the central shaft part applies the rotational force to the deceleration part 400. Here, the ring gear 430 of the deceleration part 400 formed to be integrated with the deceleration part housing 300 is rotated so that the knuckle 100 and the deceleration part housing 300 are integrally rotated.

The deceleration part 400 includes the sun gear 410 having the central shaft part inserted thereinto so as to be integrally rotated with the central shaft part, at least one planetary gear 422 formed on the outer surface of the sun gear 410, and the carrier 421 formed to protrude from the upper end of the deceleration part housing 300 in a state of including the center axis of the planetary gear 422 and coupled to the vehicle body. Furthermore, the deceleration part 400 includes the ring gear 430 fixed to the deceleration part housing 300 and integrally rotated with the deceleration part housing 300 when the planetary gear 422 rotates.

According to one embodiment of the present disclosure, the carrier 421 protruding from the upper end of the deceleration part housing 300 is configured to be fixed to the vehicle body through the steering support link 700. Further, the lower end of the deceleration part housing 300 is configured to be rotated with respect to a joint part 800 fixed to the vehicle body. In other words, the steering support link 700 coupled to the carrier 421 is configured to allow the carrier 421 to be fixed to the vehicle body. Here, the center axis of the planetary gear 422 is kept integrally fixed with the carrier 421. Accordingly, the deceleration part housing 300 including the ring gear 430 is configured to be integrally rotated with the knuckle 100 in a state of being coupled to the knuckle 100 according to rotation of the planetary gear 422. Additionally, the center axis of the planetary gear 422 is configured to be parallel to the kingpin axis A.

In one embodiment, slot parts 110 are respectively provided at opposite ends in the height direction of the knuckle 100 having the deceleration part housing 300 coupled thereto. Each of the slot parts 110 may be coupled to a corresponding one of coupling parts 310 formed in the deceleration part housing 300. In this manner, the slot part 100 and the coupling part 310 are mutually constrained. According to an embodiment of the present disclosure, each of the slot parts 110 may be formed to allow each of the coupling parts 310 of the deceleration part housing 300 to be inserted into a space formed in the center of each of the slot parts 110. Accordingly, at least opposite sides of the slot part 110 are mutually constrained by the coupling part 310.

A bearing part 900 may be located between the planetary gear set 420 and the deceleration part housing 300. In one form, at least one bearing part 900 may be located between the carrier 421 and the deceleration part housing 300. Therefore, when the ring gear 430 and the deceleration part housing 300 are integrally rotated in response to rotation of the planetary gear 422 through the bearing part 900, frictional force occurring between the deceleration part housing 300 and the carrier 421 may be reduced. The bearing part 900 is located to enable relative rotation between the carrier 421 and the deceleration part housing 300.

The carrier 421 protruding upwards from the deceleration part housing 300 has a lock nut 710 coupled thereto and is configured to be fixed to the steering support link 700. In addition, a spacer 720 is inserted between the upper surface of the deceleration part housing 300 and the steering support link 700. Accordingly, in a state in which the carrier 421 is fixed, the deceleration part housing 300 may be freely rotated around the center axis of the carrier 421. In other words, a gap is formed between the upper end of the deceleration part housing 300 and the steering support link 700 through the spacer 720.

In one embodiment, a spline structure may be formed around the outer peripheral surface of the carrier 421 formed to protrude from the upper end of the deceleration part housing 300, and the inner peripheral surface of the steering support link 700 coupled to the carrier 421 may have a protrusion formed thereon and inserted into the spline structure formed around the outer peripheral surface of the carrier 421. Accordingly, the steering support link 700 is coupled to the carrier 421 formed to protrude from the upper end of the deceleration part housing 300 and is configured to restrict rotation of the carrier 421.

In addition, because rotation of the carrier 421 forming the center axis of the planetary gear 422 is restricted, rotation of the planetary gear 422 is restricted to prevent the planetary gear 422 from revolving along the outer peripheral surface of the sun gear 410 during rotation of the sun gear 410. In other words, the planetary gear 422 is configured to perform only the rotation thereof. Therefore, when the ring gear 430 of the deceleration part housing 300 coupled to the knuckle 100 is rotated, the deceleration part housing 300 is configured to input the steering angle of the wheel 20 integrally with the knuckle 100.

The independent steering apparatus 10 further includes the bearing part 900 located outside the deceleration part housing 300 and/or the carrier 421 and configured to reduce, when the deceleration part housing 300 is rotated, friction occurring between the outer surface of the carrier 421 and the inner surface of the deceleration part housing 300. In one embodiment, the bearing part 900 may be located between the central shaft part and the deceleration part housing 300.

In one form, the joint part 800 penetrates the lower end of the knuckle 100 to be located at the lower end of the deceleration part housing 300, thereby forming a lower center axis around which the deceleration part housing 300 is rotated. In another embodiment, the center axis of the carrier 421 formed to protrude from the upper end of the deceleration part housing 300 and the lower center axis of the joint part 800 may form the kingpin axis A of the steering apparatus. In the embodiment of the present disclosure, the joint part 800 may be formed of a ball joint, and the joint part 800 is located between the lower end of the deceleration part housing 300 and the vehicle body.

Figure 2:
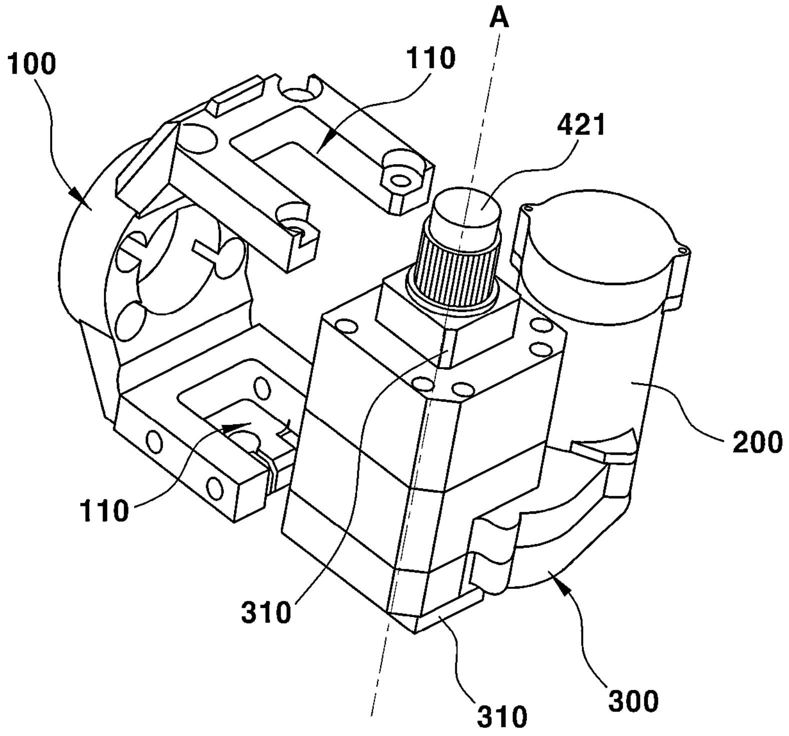
FIG. 2 is a diagram showing a coupling relationship between the independent steering apparatus and a knuckle according to an embodiment of the present disclosure.

According to the embodiment of the present disclosure, FIG. 2 shows the slot parts 110 of the knuckle 100, each of which includes rods parallel to each other, and the coupling parts 310 respectively formed at the opposite ends of the deceleration part housing 300. Here, each of the coupling parts 310 is coupled to a corresponding one of the slot parts 110.

Each of the slot parts 110 located in the knuckle 100 is formed to have one open end, and the rods parallel to each other are disposed in each of the slot parts 110 so as to surround opposite side surfaces of each of the coupling parts 310, the opposite side surfaces facing each other. In one form, each of the coupling parts 310 is inserted into a slot formed between the rods provided in each of the slot parts 110. In this manner, the slot part 110 is coupled to the coupling part 310 so as to constrain at least three side surfaces of the coupling part 310. According to a coupling relationship between the coupling part 310 and the slot part 110, the deceleration part housing 300 and the knuckle 100 are configured to be integrally rotated according to rotation of the deceleration part housing 300.

The slot part 110 of the knuckle 100 coupled to the joint part 800 includes an insertion groove so that at least a part of the joint part 800 faces the upper end of the deceleration part housing 300, and the joint part 800 is configured to be coupled to the lower end of the deceleration part housing 300 along the insertion groove.

Moreover, the carrier 421 formed to protrude from the upper end of the deceleration part housing 300 is formed to protrude along the upper end of the coupling part 310 of the deceleration part housing 300, and the same is configured to be fixed to the vehicle body through the steering support link 700. Furthermore, the steering support link 700 is located on the vehicle body so as to be rotationally constrained with respect to the kingpin axis of the vehicle.

Additionally, the steering driving part 200 is located adjacent to the deceleration part housing 300 coupled to the knuckle 100 in a state of including the deceleration part 400. Here, the steering driving part 200 is coupled to the deceleration part housing 300 in a state of facing the deceleration part housing 300 coupled to the knuckle 100 in the longitudinal direction of the deceleration part housing 300. In one embodiment, the kingpin axis A formed on the rotation center axes of the upper end and the lower end of the knuckle 100 and the rotation center shaft of the steering driving part 200 are configured to be parallel to each other.

Figure 3:
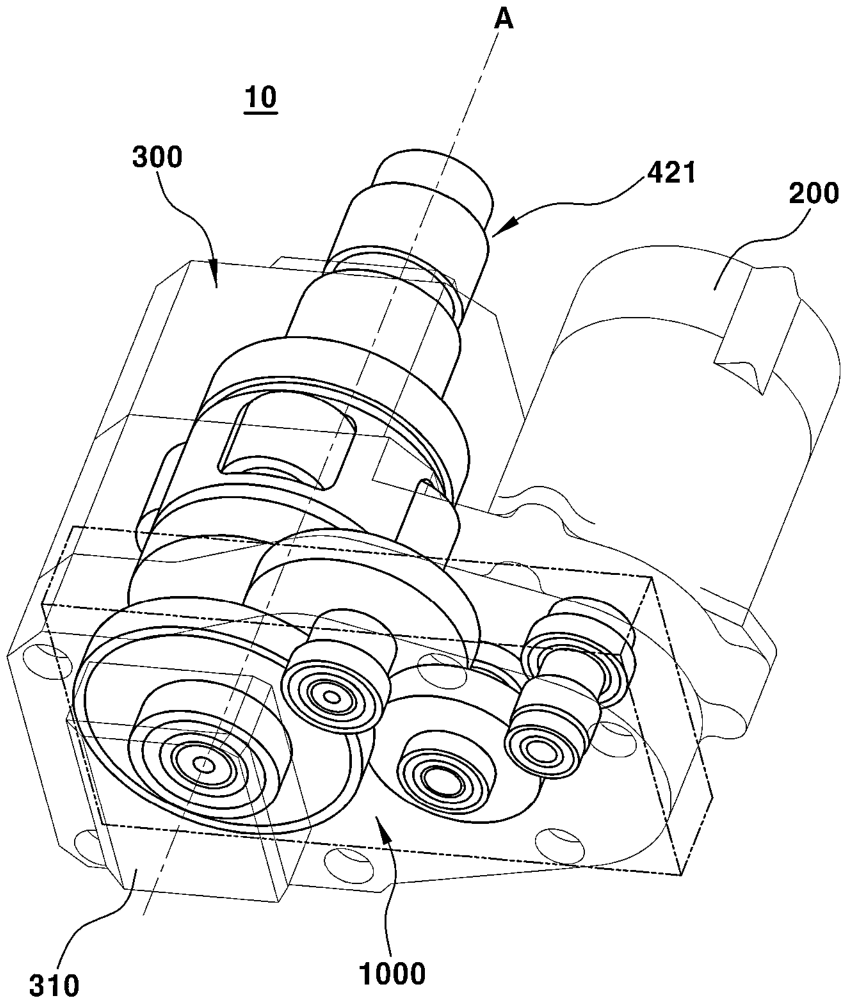
FIG. 3 is a diagram showing the independent steering apparatus in a state of being coupled to the knuckle according to an embodiment of the present disclosure.

FIG. 3 shows the external gear set 1000 located in the deceleration part housing 300 and configured to couple the steering driving part 200 to the deceleration part 400 according to the embodiment of the present disclosure.

The external gear set 1000 may include a plurality of rotating gears engaged with the rotation center shaft of the steering driving part 200. Axes of the plurality of rotating gears forming the external gear set 1000 are fixed in the deceleration part housing 300, and the plurality of rotating gears are located to transmit rotational force of the steering driving part 200 to the central shaft part. In an embodiment, the rotating gears forming the external gear set 1000 may include a bearing so as to be freely rotated along the inside of the deceleration part housing 300.

In one embodiment, a plate cover 302 may include an upper cover and a lower cover bolted to each other, and the plate cover 302 may be bolted and fixed to a deceleration part cover 301.

The rotation center shaft of the steering driving part 200 is located on the plate cover 302 that is located far from the deceleration part cover 301, and the central shaft part is located at a position corresponding to the rotation axis of the deceleration part 400. The central shaft part protrudes toward the inside of the deceleration part cover 301 of the deceleration part housing 300 and is coupled to the deceleration part 400. Furthermore, the central shaft part is located to be freely rotated in the deceleration part housing 300. In addition, the rotation center shaft of the steering driving part 200 is configured to apply rotational force to the central shaft part through the external gear set 1000.

The rotation center shaft of the steering driving part 200 is configured to be parallel to the kingpin axis A serving as the rotation axis of the deceleration part housing 300 coupled to the knuckle 100, and the same is located on the plate cover 302 and is located on one side surface of the plate cover 302 facing the deceleration part cover 301. Therefore, as shown in the drawing, the protruding deceleration part cover 301 and the steering driving part 200 are configured to be located on one side surface of the plate cover 302.

Figure 4:
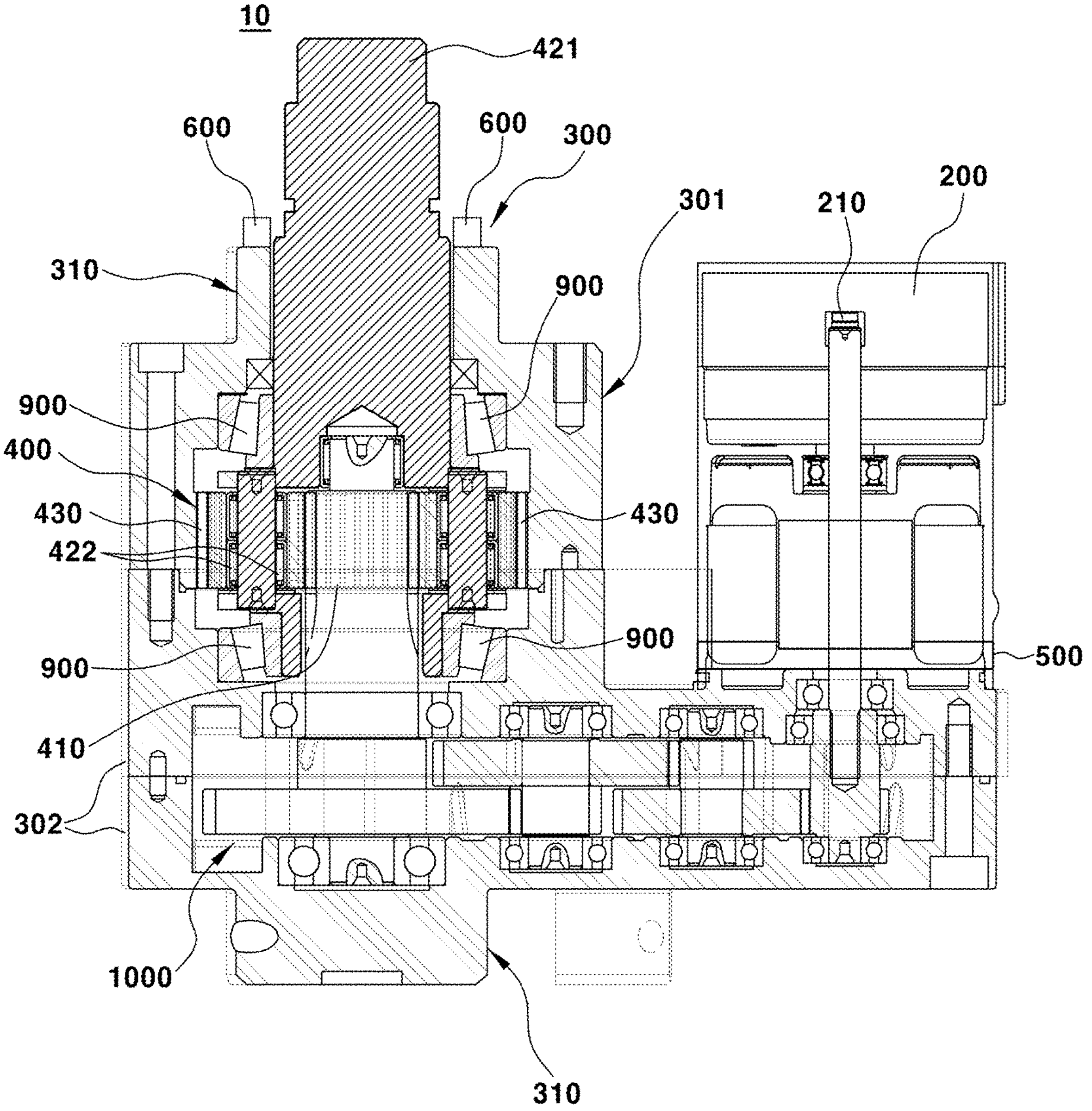
FIG. 4 is a cross-sectional view of the independent steering apparatus according to an embodiment of the present disclosure.

FIG. 4 is a cross-sectional view of the deceleration part housing 300 formed of the deceleration part cover 301 and the plate cover 302 according to the embodiment of the present disclosure.

The deceleration part housing 300 may be divided into the deceleration part cover 301 formed in the height direction of the knuckle 100 so as to allow the deceleration part 400 to be located therein, and the plate cover 302 to which the central shaft part located at the lower end of the deceleration part 400, the external gear set 1000, and the steering driving part 200 are coupled.

Additionally, the deceleration part cover 301 of the deceleration part housing 300 is configured to surround the deceleration part 400, and the plate cover 302 coupled to the lower end of the deceleration part cover 301 is configured to surround the external gear set 1000. The plate cover 302 is configured to have a longer side surface than that of the deceleration part cover 301, and the steering driving part 200 is coupled to the end of the plate cover 302 formed to extend outside the deceleration part cover 301.

In one embodiment, the rotation center shaft of the steering driving part 200 extends inside the plate cover 302 and is geared with the external gear set 1000. Accordingly, at least one rotating gear located in the external gear set 1000 is rotated in response to rotation of the steering driving part 200, and as such the central shaft part coupled to one end of the external gear set 1000 adjacent to the deceleration part 400 is rotated.

Furthermore, the independent steering apparatus 10 further includes a clutch part 500 configured to surround the rotation center shaft of the steering driving part 200 and located between the steering driving part 200 and the plate cover 302. When the steering driving part 200 is switched to the off state, the clutch part 500 is configured to prevent the rotation center shaft of the steering driving part 200 from being rotated due to backlash or gear clearance between the steering driving part 200 and the rotating gear set.

Therefore, when the vehicle is turned off or the steering driving part 200 is switched to the off state, movement of the rotation center shaft of the steering driving part 200 is restricted through the clutch part 500, thereby making it possible to maintain the set steering angle.

According to the embodiment of the present disclosure, the clutch part 500 may include all types of clutches such as an electronic clutch, a hydraulic clutch, and a cable wire clutch capable of fixing the rotation center shaft of the steering driving part 200 to the external gear set 1000.

In addition, one end of the central shaft part is located on the plate cover 302 and at least a part thereof is inserted into the deceleration part cover 301. Furthermore, the central shaft part inserted into the deceleration part cover 301 is inserted into the sun gear 410 of the deceleration part 400, thereby enabling the sun gear 410 to be integrally rotated with the central shaft part in response to rotation of the central shaft part.

The central shaft part receives rotational force of the steering driving part 200 through the external gear set 1000. Here, when the central shaft part is rotated, the sun gear 410 is configured to be rotated in the deceleration part cover 301. At least one planetary gear 422 located in contact with the outer peripheral surface of the sun gear 410 is rotated in response to rotation of the sun gear 410.

Here, at least a part of the carrier 421 of the planetary gear set 420 protrudes from the upper end of the deceleration part cover 301 and is coupled to the vehicle body through the steering support link 700. In addition, the carrier 421 located on the center axis of the planetary gear 422 is fixed to the vehicle body to prevent the planetary gear 422 from being rotated along the outer peripheral surface of the sun gear 410 and, as such, the planetary gear 422 is configured to rotate around the center axis thereof in response to rotation of the sun gear 410.

The ring gear 430 coupled to the outer circumferential surface of the planetary gear 422 is formed to be integrated with the deceleration part cover 301, and the same is configured to be rotated with respect to the center axis of the sun gear 410 in response to rotation of the planetary gear 422. Additionally, the ring gear 430 is formed to be integrated with the deceleration part housing 300, and the deceleration part housing 300 and the knuckle 100 are integrally rotated with respect to the carrier 421 formed to protrude from the upper end of the deceleration part housing 300 and the joint part 800 coupled to the lower end of the deceleration part housing 300.

Therefore, the steering driving part 200 is rotated in response to an input from a user, and rotational force of the steering driving part 200 is converted into rotational force of the deceleration part housing 300. Accordingly, the steering driving part 200 coupled to the deceleration part housing 300, the deceleration part housing 300, and the knuckle 100 are integrally rotated.

The independent steering apparatus 10 further includes a sensor part 600 formed at a position where the carrier 421 and the steering support link 700 are coupled to each other. The sensor part 600 is configured to surround at least a part of the carrier 421 at the upper end of the deceleration part housing 300. Furthermore, the sensor part 600 may determine the current steering angle input in real time to secure driving performance of a vehicle, and the same may detect the rotation angle (steering angle) positions of the deceleration part housing 300 and the knuckle 100 when the vehicle is turned off or the steering driving part 200 is switched to the off state.

Therefore, when the vehicle is restarted or power is applied to the steering driving part 200, the input state of the current steering angle is measured using the sensor part 600, and a controller may control the steering driving part 200 by receiving the steering angle input from a user based on the measured input state of the current steering angle. Through this configuration, it is possible not only to reduce current consumption required to perform steering driving during travelling of a vehicle, but also to perform accurate steering driving based on the accurate steering angle state.

Figure 5:
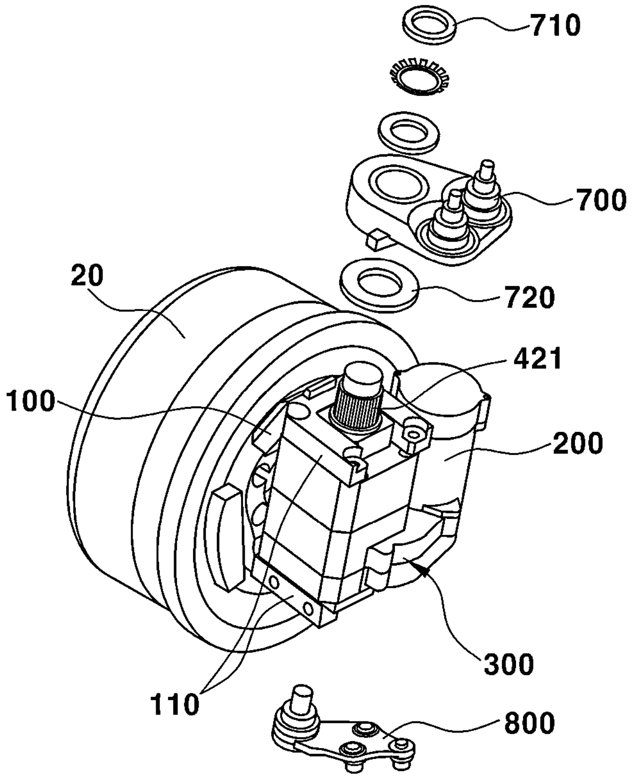
FIG. 5 is a diagram showing a coupling relationship between a deceleration part housing and a vehicle body according to an embodiment of the present disclosure.

FIG. 5 is a diagram showing a configuration of the independent steering apparatus 10 coupled to the wheel 20 according to the embodiment of the present disclosure.

As shown in the drawing, the independent steering apparatus 10 includes the knuckle 100 coupled to the inner surface of the wheel 20, and each of the slot parts 110 located on the knuckle 100 is coupled to a corresponding one of the coupling parts 310 respectively located at the upper end and the lower end of the deceleration part housing 300. In one embodiment, at least three side surfaces of the coupling part 310 inserted into the slot part 110 are constrained by contacting the slot part 110, and the knuckle 100 and the deceleration part housing 300 are mutually constrained and configured to be integrally rotated.

Furthermore, the independent steering apparatus 10 includes the carrier 421 formed to protrude from the upper surface of the deceleration part housing 300 and fixed to the vehicle body through the steering support link 700, and the joint part 800, at least a part of which is inserted into the lower surface of the deceleration part housing 300. The carrier 421 is fixed to the vehicle body through the steering support link 700 and rotation thereof is restricted, and the deceleration part housing 300 may include at least one bearing located therein and formed on the surface thereof facing the carrier 421 so as to be freely rotated with respect to the carrier 421. Therefore, the deceleration part housing 300 is configured to be integrally rotated with the knuckle 100 with respect to the carrier 421.

The outer surface of the carrier 421 formed to protrude from the upper end of the deceleration part housing 300 includes a spline structure, and the steering support link 700 is coupled to the spline structure. Accordingly, the carrier 421 and the steering support link 700 are mutually constrained. Furthermore, the independent steering apparatus 10 includes the spacer 720 located between the upper surface of the deceleration part housing 300 and the steering support link 700. The spacer 720 has a function of preventing, when the deceleration part housing 300 is rotated, interference between the deceleration part housing 300 and the steering support link 700. In addition, the lock nut 710 configured to couple the carrier 421 to the steering support link 700 is provided at the upper end of the steering support link 700 coupled to the carrier 421. Accordingly, the carrier 421 remains fixed to the vehicle body through the steering support link 700.

The steering driving part 200 may be located on the plate cover 302 and may be formed adjacent to the deceleration part cover 301. Additionally, the rotation center shaft of the steering driving part 200 may be parallel to the rotation axis of the deceleration part housing 300.

As described above, the present disclosure provides the independent steering apparatus 10 that includes the steering driving part 200 and the knuckle 100 positioned in a state of being constrained in the deceleration part housing 300 and that allows the deceleration part housing 300 to be integrally rotated with the steering driving part 200 and the knuckle 100 when rotational force of the steering driving part 200 is applied to rotate the deceleration part housing 300.

As is apparent from the above description, the present disclosure may achieve the following effects by combining the embodiments with the above-described configuration, combination, and use relationship.

The present disclosure has an effect of providing an independent steering apparatus having a compact size.

In addition, the present disclosure provides a deceleration part housing integrally rotated with a knuckle and a steering driving part integrally rotated with the deceleration part housing, thereby having an effect of providing an independent steering apparatus configured to allow a vehicle to have a low floor.

The present disclosure has been described in detail with reference to some embodiments thereof, and the present disclosure may be used in various other combinations, modifications, and environments. In other words, it should be appreciated by those having ordinary skill in the art that changes may be made in these embodiments without departing from the principles and spirit of the present disclosure, the scope of which is defined in the appended claims and equivalents thereto. The embodiments describe the best mode to implement the technical idea of the present disclosure, and various changes required in specific application fields and uses of the present disclosure are also possible. Accordingly, the detailed description of the present disclosure is not intended to limit the present disclosure to the disclosed embodiments. Additionally, the scope of the appended claims should be construed as including other embodiments as well.

REFERENCE NUMERALS SET FORTH IN THE DRAWINGS

| | |
|---|---|
| A: Kingpin axis | 10: Independent steering apparatus |
| 20: Wheel | 100: Knuckle |
| 110: Slot part | 200: Steering driving part |
| 300: Deceleration part housing | 301: Deceleration part cover |
| 302: Plate cover | 310: Coupling part |
| 400: Deceleration part | 410: Sun gear |
| 420: Planetary gear set | 421: Carrier |
| 422: Planetary gear | 430: Ring gear |
| 500: Clutch part | 600: Sensor part |
| 700: Steering support link | 710: Lock nut |
| 720: Spacer | 800: Joint part |
| 900: Bearing part | 1000: External gear set |

What is claimed is:

1. An independent steering apparatus comprising:

a wheel of a vehicle;

a knuckle integrally fixed to the wheel;

a steering driving part configured to generate steering driving force;

a deceleration part connected to an output shaft of the steering driving part and configured to transmit the steering driving force, wherein the deceleration part includes a planetary gear set; and a deceleration part housing configured to accommodate the deceleration part, wherein the steering driving part is integrally fixed to the deceleration part housing, and the deceleration part housing is integrally fixed to the knuckle, and wherein the steering driving force generated by the steering driving part is transmitted to the deceleration part housing through the deceleration part such that the knuckle is rotated, and wherein the deceleration part housing and the steering driving part are integrally rotated with the knuckle.

2. The independent steering apparatus of claim 1, wherein the planetary gear set has a rotational center axis coinciding with a kingpin axis.

3. The independent steering apparatus of claim 1, wherein the deceleration part further comprises a plurality of external gear sets or belts.

4. The independent steering apparatus of claim 1, wherein the planetary gear set comprises first, second and third rotating elements, and the first rotating element is connected to a vehicle body so as to be rotationally constrained.

5. The independent steering apparatus of claim 4, wherein the second rotating element is connected to the output shaft of the steering driving part, and the third rotating element is connected to the deceleration part housing.

6. The independent steering apparatus of claim 5, wherein:

the second rotating element is a sun gear connected to the output shaft of the steering driving part;

the first rotating element is a carrier connected to the vehicle body so as to be rotationally constrained; and the third rotating element is a ring gear connected to the deceleration part housing.

7. The independent steering apparatus of claim 6, wherein, when the driving force of the steering driving part is applied to the sun gear, the carrier is rotationally constrained by the vehicle body, and the deceleration part housing is integrally rotated with the ring gear.

8. The independent steering apparatus of claim 6, further comprising a steering support link connected to the vehicle body and coupled to the carrier.

9. The independent steering apparatus of claim 8, wherein the carrier and the steering support link are coupled to each other by a spline connection.

10. The independent steering apparatus of claim 8, wherein the steering support link is connected to the vehicle body so as to be rotationally constrained with respect to a kingpin axis.

11. The independent steering apparatus of claim 6, further comprising at least one bearing part formed between the carrier and the deceleration part housing so that the carrier and the deceleration part housing are rotatable relative to each other.

12. The independent steering apparatus of claim 1, further comprising:

slot parts respectively located at opposite ends of the knuckle facing the deceleration part housing; and coupling parts located in the deceleration part housing, wherein each of the coupling parts is coupled to a corresponding slot part among the slot parts.

13. An independent steering apparatus comprising:

a wheel of a vehicle;

a knuckle integrally fixed to the wheel;

a steering driving part configured to generate steering driving force;

a deceleration part connected to an output shaft of the steering driving part and configured to transmit the steering driving force, wherein the deceleration part includes a planetary gear set; and a deceleration part housing having the deceleration part located therein, wherein the steering driving part is integrally fixed to the deceleration part housing, and the deceleration part housing is integrally fixed to the knuckle, wherein the deceleration part housing and the steering driving part are integrally rotated with the knuckle.

* * * * *